United States Patent [19]

Park

[11] Patent Number: 5,096,675
[45] Date of Patent: Mar. 17, 1992

[54] APPARATUS FOR CONTINUOUS CALCINING IN NOXIOUS GAS

[75] Inventor: Youngbae Park, Suwon, Rep. of Korea

[73] Assignee: Samsung Electron Devices Co., Ltd., Kyungki-do, Rep. of Korea

[21] Appl. No.: 446,029

[22] Filed: Dec. 5, 1989

[51] Int. Cl.$^5$ ............................ B01J 8/08; F27D 5/00
[52] U.S. Cl. ................................. 422/233; 422/237; 432/6
[58] Field of Search ............... 422/184, 129, 171, 233, 422/237; 432/2, 5, 6

[56] References Cited

U.S. PATENT DOCUMENTS

| | | | |
|---|---|---|---|
| 2,236,138 | 3/1941 | Howard | 422/219 |
| 3,778,221 | 11/1973 | Bloom | 432/11 |
| 3,905,758 | 9/1975 | Moussou et al. | 432/124 |
| 4,384,877 | 5/1983 | Nemetz | 422/184 |

Primary Examiner—David M. Naff
Assistant Examiner—Timothy J. Reardon
Attorney, Agent, or Firm—Kenyon & Kenyon

[57] ABSTRACT

Materials to be calcined are introduced through an outer entrance into a front chamber while keeping an inner entrance closed. The outer entrance is then closed, the inner entrance is opened, and the materials are advanced into a calcining furnace through the inner entrance and are calcined therein. The calcined materials are then advanced into a rear chamber through an inner exit while an outer exit is kept closed. The inner exit then is closed, the outer exit is opened, and the calcined materials are carried out of the rear chamber through the outer exit. The calcining apparatus includes a tubular calcining furnace. A feed pipe and an exhaust pipe for reaction gases are attached to both ends of the furnace. The apparatus also includes a front chamber and a rear chamber, each having an inner entrance/exit and an outer entrance/exit. The front chamber and the rear chamber are also attached to the exhaust pipe. Finally, the calcining apparatus includes a carrier containing the materials to be calcined which is passed through the front chamber, the tubular calcining furnace, and the rear chamber, consecutively.

2 Claims, 3 Drawing Sheets

APPARATUS FOR CONTINUOUS CALCINING IN NOXIOUS GAS

BACKGROUND OF THE INVENTION

The present invention relates to a method and apparatus for calcining and more particularly to a method and apparatus for continuous calcining under a noxious gas atmosphere.

Fluorescent calcium sulfide (CaS) is an excellent material for forming the fluorescent screen of a cathode-ray tube because it is inexpensive and it has favorable characteristics when compared with other fluorescent materials. However, calcium sulfide also deteriorates when in contact with water during the application of the fluorescent screen, rendering it inadequate for practical use.

As a result, investigations have been performed concerning methods of treating fluorescent calcium sulfide to prevent its deterioration by water so that its excellent luminous efficiency can be utilized. Consequently, remarkable progress has been made concerning a number of red-colored calcium sulfide fluorescent materials. These materials are expected to be adopted for practical use in the near future.

Fluorescent calcium sulfide can be obtained by calcining calcium carbonate under a hydrogen sulfide atmosphere. However, it is quite difficult to continuously calcine the fluorescent calcium sulfide because hydrogen sulfide is extremely flammable and noxious, having a lethal dose of 1,000 to 1,500 ppm.

The previous method of calcining fluorescent calcium sulfide material is based on a batch process wherein a fixed quantity of calcium carbonate is calcined under an isolated hydrogen sulfide atmosphere. After the material is completely calcined, drawn out of furnace, and replaced by fresh calcium carbonate, this process is repeated. This type of batch processing, however, is not adequate for mass production.

In view of the prior art, there is a need for a method for continuous calcining under a noxious gas atmosphere as well as an apparatus to carry out such a method, enabling the mass production of fluorescent calcium sulfide.

SUMMARY OF THE INVENTION

According to the present invention, continuous calcining is achieved by first introducing the materials to be calcined into a front chamber. This transfer is made by way of an outer entrance while an inner entrance is kept closed. The outer entrance is then closed, the inner entrance opened, and the materials are advanced through the inner entrance into a calcining furnace where they are calcined. The calcined materials are then advanced into a rear chamber by way of an inner exit while keeping an outer exit closed. The inner exit is then closed, the outer exit opened, and the calcined materials are carried out of the rear chamber through the outer exit.

Also, according to the present invention, the calcining apparatus suitable for carrying out the above-mentioned method includes a tubular calcining furnace. A feed pipe and an exhaust pipe for reaction gases are attached to both ends of the tubular calcining furnace. The apparatus also includes a front chamber and a rear chamber each having an inner entrance/exit and an outer entrance/exit. The front and rear chambers are also attached to the exhaust pipe. Finally, the calcining apparatus includes a carrier upon which the materials to be calcined are placed and passed through the front chamber, the tubular calcining furnace, and the rear chamber, sequentially.

The interiors of the front and rear chambers are provided with a shuttle and a pusher. The shuttle receives the carrier and changes the course of the carrier, and the pusher thrusts the carrier out of the shuttle. The shuttle and pusher in the front chamber are operated to advance the carrier into the calcining furnace. Conversely, the shuttle and pusher in the rear chamber are operated to bring the carrier out of the calcining furnace.

DETAILED DESCRIPTION

Figure 1:
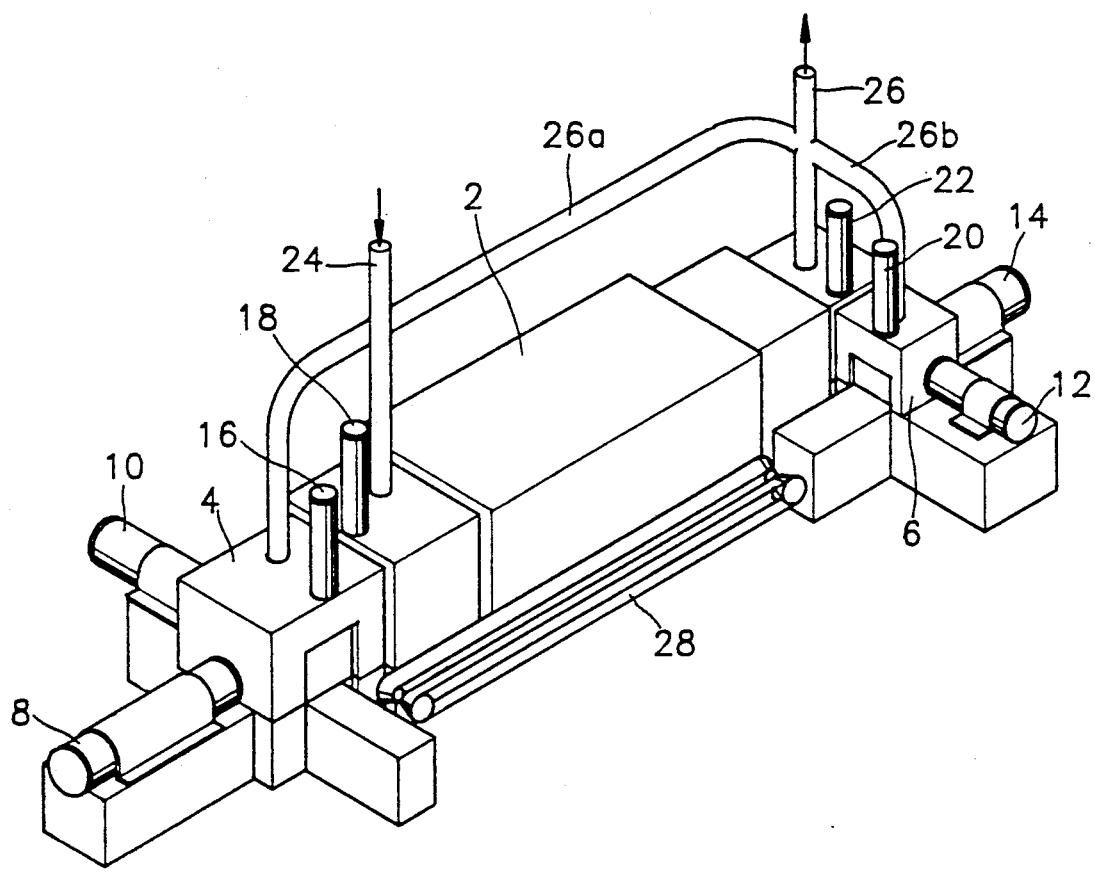
FIG. 1 show a perspective view of a calcining furnace of the present invention.

FIG. 1 illustrates the external appearance of a calcining apparatus according to the present invention. A front chamber 4 and a rear chamber 6 are disposed at both ends of a tubular calcining furnace 2, respectively. Actuators 8, 10, 12, and 14, which operate shuttles and pushers, are installed around the front chamber 4 and the rear chamber 6. Other actuators 16, 18, 20, and 22, which open and shut the inner and outer entrances/exits, are installed above the front chamber 4 and the rear chamber 6.

A feed pipe 24 is attached to one end of the furnace 2 to supply the reaction gas to the furnace 2, and an exhaust pipe 26 is attached to the other end of the furnace 2 in order to remove the reaction gas from the furnace 2. The exhaust pipe 26 is also attached to the front chamber 4 and the rear chamber 6 by conduit pipes 26a and 26b.

A conveyer 28 which advances carriers to the front of the front chamber 4 is installed parallel to the tubular calcining furnace 2.

Figure 2:
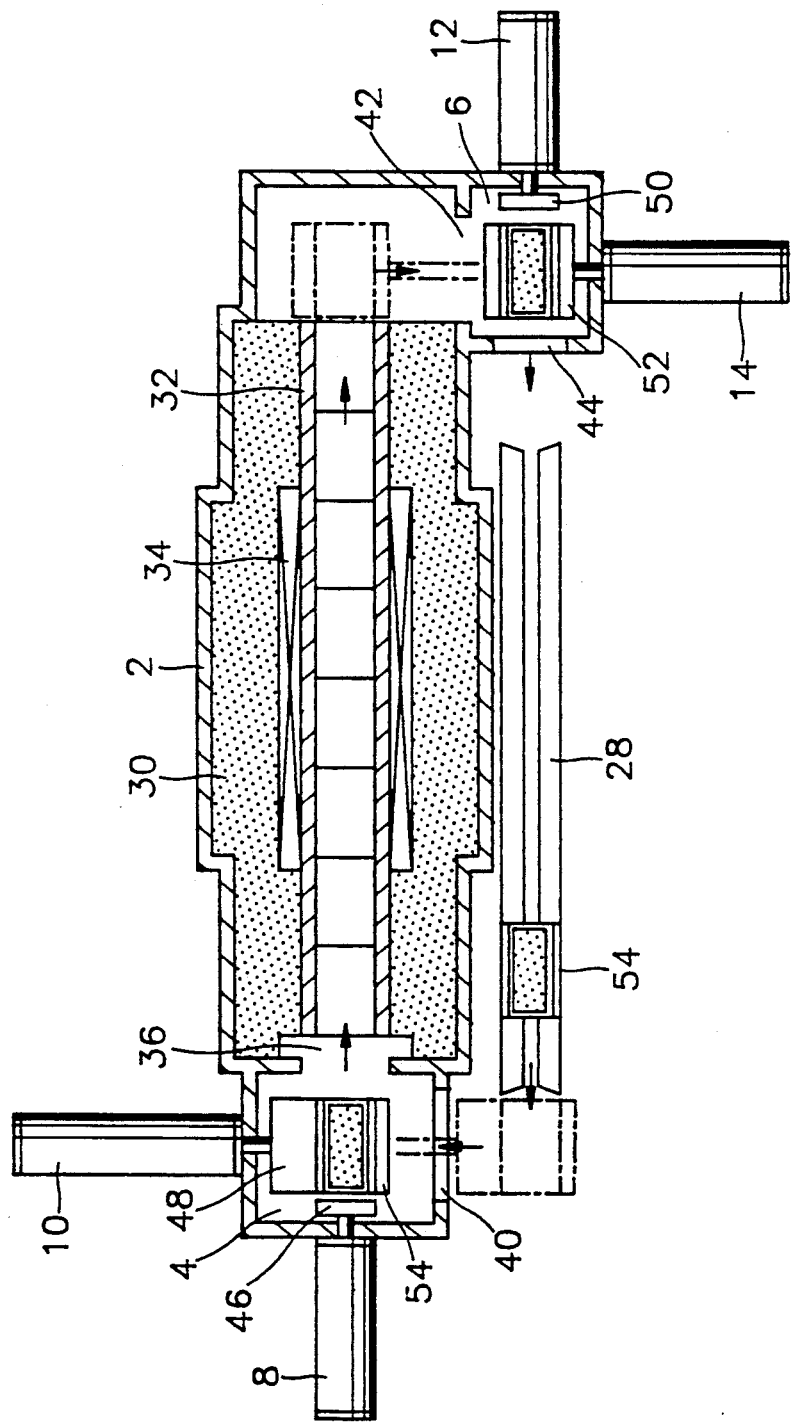
FIG. 2 shows a sectional plane view of FIG. 1.

As seen in FIG. 2, an aluminum calcining tube 32 of circular cross-section and surrounded by an adiabatic layer 30 (e.g., firebricks) is installed inside the tubular calcining furnace 2. The calcining tube 32 has an electric heater 34 at its periphery.

The front chamber 4 and rear chamber 6 each includes inner and outer entrances/exits 36, 40, 42 and 44. The inner entrance 36 and the inner exit 42 lead to the furnace 2, and the outer entrance 40 and outer exit 44 lead to the outside. These entrances and exits are opened and closed using doors which are operated by means of the actuators 16, 18, 20, and 22.

A pusher 46 moves back and forth coaxially with respect to the longitudinal axis of the furnace 2 by means of the actuator 8. A shuttle 48 moves back and forth perpendicularly with respect to the longitudinal axis of the furnace 2 by means of the actuator 10. Both the pusher 46 and the shuttle 48 are disposed inside the front chamber 4.

Similarly, a pusher 50 and a shuttle 52 are moved back and forth coaxially and perpendicularly, respectively, to the longitudinal axis of the furnace 2 by means of actuators 12 and 14, respectively. Both the pusher 50 and the shuttle 52 are disposed inside the rear chamber 6.

The pusher 46 is operated through the inner entrance 36 and the shuttle 48 is operated through the outer entrance 40. The pusher 50 is operated through the outer exit 44 and the shuttle 52 is operated through the inner exit 42.

Carriers 54 are forwarded to the front of the outer entrance 40 by means of a conveyer 28.

Figure 3:
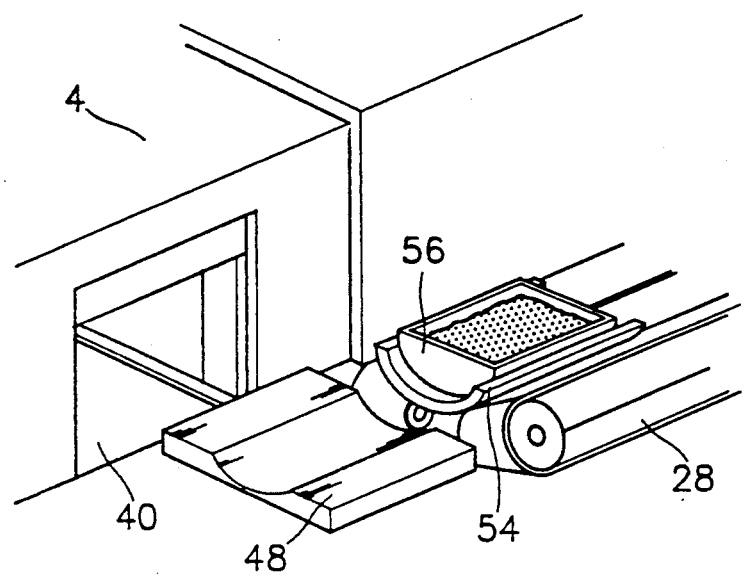
FIG. 3 shows a partial perspective view taken from FIG. 1 illustrating the transfer of the carrier from the conveyer to the shuttle.

FIG. 3 illustrates a carrier 54 which has just been advanced by the conveyer 28 and is about to be moved onto the shuttle 48.

In order to fit the circular cross-section of the calcining tube 32 seen in FIG. 2, the bottom of a vessel 56 (which contains the materials to be calcined by advancing them through the calcining tube 32) is shaped with a semicircular cross-section. The carrier 54, which carries the vessel 56, as well as the groove on the shuttle 48, which receives the carrier 54 thereon, are also of semicircular cross-section.

The carrier 54 is transferred from the conveyer 28 to the shuttle 48 which extends to the position represented by the dashed line in FIG. 2. The carrier 54 and the shuttle 48 are advanced through the outer entrance 40 by means of the actuator 10 in the front chamber 4. Because the inner entrance 36 is kept closed, no leakage of the noxious gas is detected at this step.

As the shuttle 48 and the carrier 54 are withdrawn into the front chamber 4, the outer entrance 40 is closed and the inner entrance 36 is subsequently opened. The carrier 54 is then thrust from the shuttle 48 into the furnace 2 by means of the pusher 46 which is extended by the operation of the actuator 8.

Referring to FIG. 2, after the carrier 54 is inserted into the calcining tube 32 of the furnace 2 through the inner entrance 36, the pusher 46 is retracted in situ and the inner entrance 36 is again closed. Although noxious gas from the furnace 2 enters the front chamber 4 while the inner entrance 36 is opened, no leakage of the noxious gas is detected on the outside because the outer entrance 40 is kept closed.

After a while, the noxious gas inside the front chamber 4 is completely discharged through the conduit pipe 26a and the exhaust pipe 26. This discharge occurs while the inner and outer entrances 36 and 40 of the front chamber 4 are kept closed.

Once inserted into the calcining tube 32 of the furnace 2, the carrier 54 is pushed through the calcining tube 32 by subsequent carriers which are thrust into the calcining tube 32 of the furnace 2.

Figure 4:
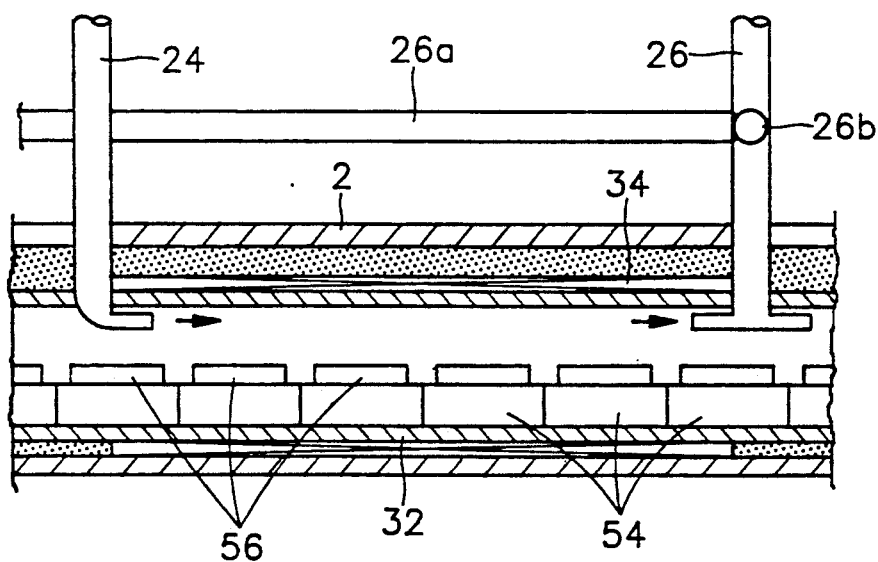
FIG. 4 shows a partial sectional side elevation illustrating the furnace part shown in FIG. 1.

FIG. 4 illustrates the carrier 54 passing through the calcining tube 32. The feed pipe 24 and the exhaust pipe 26 are attached to the entrance and exit ends of the calcining tube 32, respectively. The reaction gas (noxious gas) supplied by the feed pipe 24 passes through the calcining tube 32 in the direction shown by the arrow in FIG. 4 and is then discharged through the exhaust pipe 26. The calcining tube 32 is heated to 1,200° C. by the electric heater 34.

The materials in the vessel 56 react with the reaction gas and are calcined inside the calcining tube 32 as the carrier 54, which carriers the vessel 56, passes through.

Referring to FIG. 2, once pushed to the exit of the calcining tube 2, the carrier 54 s transferred to the shuttle 52, which is extended to the position represented by the chained line in FIG. 2. Then, the actuator 14 is operated to move the shuttle 52, conveying the carrier 54 through the inner exit 42 into the rear chamber 6. The outer exit 44, of course, is kept closed during this operation.

As the carrier 54 is brought into the rear chamber 6, the inner exit is closed and, after allowing the noxious gas inside the rear chamber 6 to discharge through the exhaust pipe 26, the outer exit 44 is opened. The carrier 54 on the shuttle 52 is then thrust out of the rear chamber 6 by means of the pusher 50 which is operated by the actuator 12.

Thus discharged, the carrier 54 is collected and sent to the next process. As detailed above, the calcining method according to the present invention can be carried out in a continuous cycle wherein the carrier which carries the vessel containing the material to be calcined is circulated in the direction represented by the arrow in FIG. 2.

Although particularly suited to the calcining of calcium carbonate under a hydrogen sulfide gas atmosphere to obtain fluorescent calcium sulfide, the application of the present invention is not limited to this process. The method and the apparatus of the present invention can also be applied to other types of calcination where noxious reaction gases are concerned, resulting in shortened working hours and greatly-enhanced productivity. When compared with the batch processing previously employed, the continuous processing provides for safer operation with no leakage of noxious gas.

What is claimed is:

1. An apparatus for continuous calcining in a noxious gas atmosphere comprising:
   a) a tubular calcining furnace;
   b) a feed pipe and an exhaust pipe for reaction gases, said feed pipe attrached to one end of said tubular calcining ends of said tubular calcining furnace;
   c) a front chamber having an inner entrance and an outer entrance, each fitted with a door which prevents leakage of said noxious gas when closed;
   d) a rear chamber having a n inner exit and an outer exit, each fitted with a door which prevents leakage of said noxious gas when closed, said front chamber and said rear chamber being attached to said exhaust pipe;
   e) carriers upon which materials to be calcined are placed and passed through said front chamber, said tubular calcining furnace, and said rear chamber, sequentially;
   f) a first shuttle inside the front chamber and a second shuttle inside the rear chamber, which receive said carrier thereon and change the course of said carrier;
   g) a first pusher by which said carrier is thrust out of said first shuttle, said first shuttle and said first pusher in said front chamber being operated to advance said carrier into said calcining furnace;
   h) a second pusher and said second shuttle in said rear chamber being operated to bring said carrier out of said calcining furnace.

2. An apparatus for continuous calcining in a noxious gas atmosphere comprising:
   a tubular calcining furnace including an electric heater at the periphery of the tubular calcining furnace and an adiabatic layer surrounding the tubular calcining furnace and electric heater;
   b) a feed pipe and an exhaust pipe for reaction gases, the feed pipe attached to one end of the tubular calcining furnace and the exhaust pipe attached to both ends of the tubular calcining furnace;

c) a front chamber having an inner entrance and an outer entrance, each fitted with door which prevents leakage of said noxious gas when closed;

d) a rear chamber having an inner exit and an outer exit, each fitted with a door which prevents leakage of said noxious gas when closed, said front chamber and said rear chamber being attached to said exhaust pipe;

e) carriers upon which materials to be calcined are placed and passed sequentially through the front chamber, the tubular calcining furnace, and the rear chamber;

f) a first shuttle within the front chamber and a second shuttle within the rear chamber, which receive said carrier thereon and change the course of said carrier;

g) a fist pusher by which said carrier is thrust out of said first shuttle, said first shuttle and said first pusher in said front chamber being operated to advance said carrier into said calcining furnace; and h) a second pusher and said second shuttle in said rear chamber being operated to bring said carrier out of said calcining furnace.

* * * * *